US012752785B2

(12) United States Patent
He et al.

(10) Patent No.: US 12,752,785 B2
(45) Date of Patent: Oct. 6, 2026

(54) ADAPTIVE CRUISE CONTROL SYSTEM AND METHOD

(71) Applicant: International Engine Intellectual Property Company, LLC, Lisle, IL (US)

(72) Inventors: Chaozhe He, Clarence Center, NY (US); Eric Jiang, Foster City, CA (US); Matthew David Hunkler, Naperville, IL (US); Dean A. Oppermann, Plainfield, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 298 days.

(21) Appl. No.: 18/235,553

(22) Filed: Aug. 18, 2023

(65) Prior Publication Data

US 2025/0058775 A1 Feb. 20, 2025

(51) Int. Cl.

*B60W 30/16* (2020.01)
*B60W 30/18* (2012.01)
*B60W 40/13* (2012.01)

(52) U.S. Cl.

CPC ...... *B60W 30/16* (2013.01); *B60W 30/18072* (2013.01); *B60W 40/13* (2013.01); *B60W 2554/802* (2020.02)

(58) Field of Classification Search

CPC ........... B60W 30/16; B60W 30/18072; B60W 2554/802; B60W 30/14

See application file for complete search history.

(56) References Cited

U.S. PATENT DOCUMENTS

| | | | |
|---|---|---|---|
| 4,914,597 A | 4/1990 | Moncelle et al. | |
| 2021/0089052 A1* | 3/2021 | Cho | G05D 1/0223 |

(Continued)

FOREIGN PATENT DOCUMENTS

| | | |
|---|---|---|
| WO | 2014149042 | 9/2014 |
| WO | 2014149043 | 9/2014 |
| WO | 2014149044 | 9/2014 |

OTHER PUBLICATIONS

C. R. He, H. Maurer, and G. Orosz, "Fuel consumption optimization of heavy-duty vehicles with grade, wind, and traffic information," Journal of Computational and Nonlinear Dynamics, vol. 11, No. 6, p. 061011, 2016.

(Continued)

*Primary Examiner* — Abby J Flynn
*Assistant Examiner* — Clint Pham
(74) *Attorney, Agent, or Firm* — Umang Khanna

(57) ABSTRACT

A vehicle longitudinal motion control apparatus for controlling a longitudinal motion of a vehicle. The vehicle longitudinal motion control apparatus includes at least one sensor configured to sense a longitudinal motion of another vehicle which precedes the vehicle and a controller having at least one control module in communication with the at least one sensor. The at least one control module is configured to determine a longitudinal motion characteristic of both vehicles and a headway distance between the first vehicle and the second vehicle. The at least one control module is further configured to apply a coasting maneuver to the vehicle based upon the determined headway distance to reduce the distance between the vehicles and increase energy efficiency of the vehicle.

14 Claims, 4 Drawing Sheets

(56) References Cited

U.S. PATENT DOCUMENTS

| | | | | |
|---|---|---|---|---|
| 2022/0063635 | A1* | 3/2022 | Kim | B60W 40/09 |
| 2022/0402487 | A1 | 12/2022 | He et al. | |
| 2023/0150502 | A1* | 5/2023 | Dickson | B60W 50/14<br>701/95 |
| 2023/0234587 | A1* | 7/2023 | Ito | B60W 50/0097<br>701/96 |

OTHER PUBLICATIONS

C. R. He, W. B. Qin, N. Ozay, and G. Orosz, "Optimal gear shift schedule design for automated vehicles: Hybrid system based analytical approach," IEEE Transactions on Control Systems Technology, vol. 26, pp. 2078-2090, 2018.
L. Guzzella and C. H. Onder, Introduction to Modelling and Control of Internal Combustion Engine Systems. Springer, 2004.
G. Orosz, "Connected cruise control: modelling, delay effects, and nonlinear behaviour," Vehicle System Dynamics, vol. 54, No. 8, pp. 1147-1176, 2016.
S. E. Li, Q. Guo, S. Xu, J. Duan, S. Li, C. Li, and K. Su, "Performance enhanced predictive control for adaptive cruise control system considering road elevation information," IEEE Transactions on Intelligent Vehicles, vol. 2, No. 3, pp. 150-160, 2017.
A. D. Ames, X. Xu, J. W. Grizzle, and P. Tabuada, "Control barrier function based quadratic programs for safety critical systems," IEEE Transactions on Automatic Control, vol. 62, No. 8, pp. 3861-3876, 2017.
C. R. He and G. Orosz, "Safety guaranteed connected cruise control," in Proceedings of the International Conference on Intelligent Transportation Systems, 2018, pp. 549-554.
J. I. Ge, S. S. Avedisov, C. R. He, W. B. Qin, M. Sadeghpour, and G. Orosz, "Experimental validation of connected automated vehicle design among human-driven vehicles impacts on traffic safety and efficiency," Transporation Research Part C, vol. 91, pp. 335-352, 2018.
C. R. He, J. I. Ge, and G. Orosz, "Fuel efficient connected cruise control for heavy-duty trucks in real traffic," IEEE Transactions on Control Systems Technology, pp. 1-8, 2019.
A. Wachter and L. T. Biegler, "On the implementation of an interior-point filter line-search algorithm for large-scale nonlinear programming," Mathematical Programming, vol. 106, No. 1, pp. 25-57, 2006.

* cited by examiner

ADAPTIVE CRUISE CONTROL SYSTEM AND METHOD

STATEMENT REGARDING FEDERALLY SPONSORED RESEARCH OR DEVELOPMENT

This invention was made with government support under DE-EE0007767 awarded by the U.S. Department of Energy. The Government therefore has certain rights in the invention.

BACKGROUND

This disclosure relates to vehicle longitudinal motion control systems. Particularly, this disclosure relates to systems and methods for autonomously or semi-autonomously controlling vehicle longitudinal motion.

RELATED ART

Adaptive Cruise Control (ACC) is a cruise control advanced driver-assistance system for road vehicles that automatically adjusts vehicle speed to maintain a safe distance from vehicles ahead. Control is based on sensor information from on-board sensors. Such systems may use radar or laser sensors, and/or cameras. The ACC system automatically decelerates the vehicle upon sensing that another vehicle ahead thereof is traveling at a slower speed. Thereafter, the ACC system accelerates the vehicle to resume a set speed when traffic allows. ACC technology impacts driver safety and convenience, and it increases road capacity by maintaining optimal separation between vehicles and reducing driver errors. Typically, an ACC system includes multiple sensors for monitoring the surrounding vehicles. For example, an ACC system may include radar or optical sensors mounted on the vehicle.

Predictive Cruise Control (PCC) modifies vehicle speed based on the calculated predictions of the other vehicles, the roadway, various geographic features, and/or weather data. Such systems can make earlier, more moderate adjustments to the speed of the vehicle having the PCC system, thereby improving safety and passenger comfort.

Traditional cruise control systems do not take energy efficiency into consideration. Such systems generally focus on maintaining a constant time gap between the host vehicle and the preceding vehicle. Additionally, such systems reduce the speed of the vehicle by applying the brakes, which constitutes an abrupt loss of kinetic energy. This results in decreased driver comfort, component wear, and increased fuel consumption due to the abrupt loss of kinetic energy.

Accordingly, there is an unmet need for an arrangement and method for economically reducing vehicle speed in order to reduce kinetic energy loss and increase energy efficiency and/or efficiency of motion.

SUMMARY

According to one embodiment of the vehicle longitudinal motion control apparatus for controlling a longitudinal motion of a first vehicle, the vehicle longitudinal motion control apparatus has at least one sensor and a controller. The at least one sensor is configured to sense a longitudinal motion of a second vehicle which precedes the first vehicle. The controller has at least one control module in communication with the at least one sensor. The at least one control module is configured to determine a longitudinal motion characteristic of the first vehicle, determine a longitudinal motion characteristic of the second vehicle, and determine a headway distance between the first vehicle and the second vehicle based upon the longitudinal motion characteristic of the first vehicle, the longitudinal motion characteristic of the second vehicle, and at least one vehicle characteristic of the first vehicle. The at least one control module is further configured to apply an energy saving maneuver to the first vehicle based upon the determined headway distance to reduce a distance between the first vehicle and the second vehicle and increase energy efficiency and/or other Key Performance Indicator (KPI) of the first vehicle.

According to another embodiment of the vehicle longitudinal motion control apparatus, a vehicle has a longitudinal motion control apparatus for controlling a longitudinal motion of the vehicle. The vehicle, and longitudinal motion control apparatus thereof, includes at least one sensor configured to sense a longitudinal motion of a preceding vehicle, and a controller. The controller has at least one control module in communication with the at least one sensor. The at least one control module is configured to determine a longitudinal motion characteristic of the vehicle, determine a longitudinal motion characteristic of the preceding vehicle, and determine a headway distance between the vehicle and the preceding vehicle based upon the longitudinal motion characteristic of the vehicle, the longitudinal motion characteristic of the preceding vehicle, and at least one vehicle characteristic of the vehicle. The at least one control module is further configured to apply an energy saving maneuver to the vehicle based upon the determined headway distance to reduce a distance between the vehicle and the preceding vehicle and increase energy efficiency of the vehicle.

According to yet another embodiment of the vehicle longitudinal motion control apparatus, a method for controlling the longitudinal motion of a first vehicle includes several steps. The method includes a step of providing a vehicle longitudinal motion control apparatus having at least one sensor configured to sense a longitudinal motion of a second vehicle which precedes the first vehicle, and a controller. The controller has at least one control module in communication with the at least one sensor. The method also includes a step of configuring the at least one control module to determine a longitudinal motion characteristic of the first vehicle. The method includes a further step of configuring the at least one control module to determine a longitudinal motion characteristic of the second vehicle. The method includes a further step of configuring the at least one control module to determine a headway distance between the first vehicle and the second vehicle based upon the longitudinal motion characteristic of the first vehicle, the longitudinal motion characteristic of the second vehicle, and at least one vehicle characteristic of the first vehicle. The method includes a further step of configuring the at least one control module to apply an energy saving maneuver to the first vehicle based upon the determined headway distance to reduce a distance between the first vehicle and the second vehicle and increase energy efficiency of the first vehicle.

DETAILED DESCRIPTION

Embodiments described herein relate to arrangements, and control logic therefor, of vehicle longitudinal motion control apparatus for efficiently and economically applying an energy saving maneuver, such as a coasting maneuver, to a vehicle. The apparatus and method may be applied to various types of passenger vehicles, commercial vehicles, and recreational vehicles, such as highway or semi-tractors, straight trucks, busses, fire trucks, motorhomes, and etcetera. It is contemplated that the apparatus and method may be applied to vehicles having drivetrains including a diesel, gasoline, or gaseous fuel engine, as well as to vehicles having electric or hybrid electric drivetrains, as non-limiting examples. It is further contemplated that the apparatus and method may be applied to vehicles having manual transmissions, automatic transmissions, automated manual transmissions, continuously variable transmissions, hybrid electric transmissions, and hydraulic transmissions, as non-limiting examples.

The present longitudinal motion control apparatus and method reduces energy consumption of the vehicle by applying an energy saving maneuver, such as a coasting maneuver, to the vehicle via an eco-coasting control module when the vehicle is being autonomously or semi-autonomously operated. The eco-coasting control module may be an independent control module or incorporated into an existing control module, such as an ACC module. The eco-coasting control module has an algorithm which continually calculates a headway distance between the vehicle and a preceding vehicle, object, or a change in the roadway such as a stoplight or a turn. The eco-coasting control module reduces the fuel or other energy supply and/or disengages power as desired to allow the vehicle to coast. Thereby, the vehicle gradually reduces its speed and does not require subsequent acceleration to recover from an abrupt braking maneuver. This results in improved driver comfort and a significant reduction in fuel or energy consumption.

Figure 1:
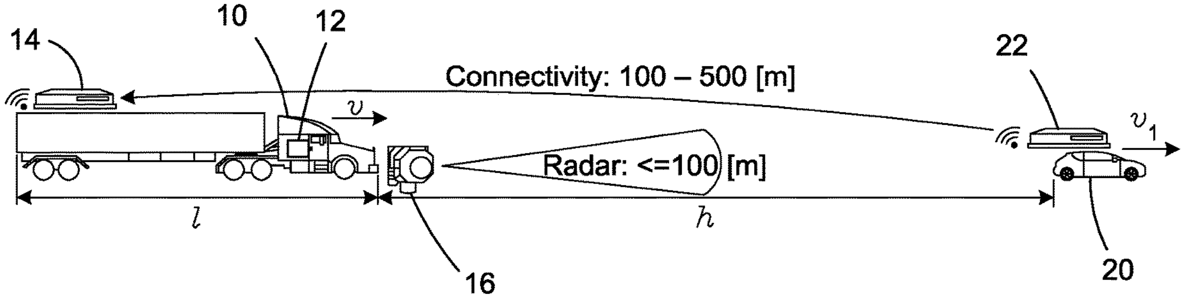
FIG. 1 is a graphic representation of an embodiment of the vehicle longitudinal motion control apparatus of the vehicle of the present disclosure, as described herein.
Figure 2:
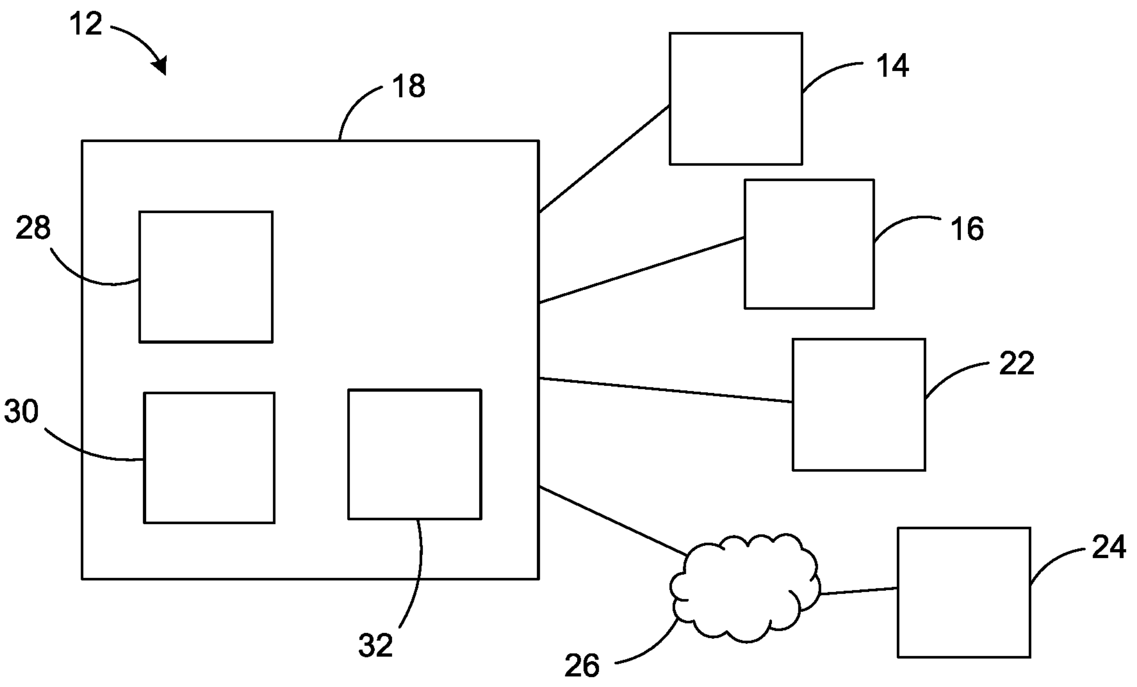
FIG. 2 is another graphic representation of the vehicle longitudinal motion control apparatus, as described herein.

Turning now to FIGS. 1-2, a vehicle 10 implementing an embodiment of the present economic vehicle longitudinal motion control apparatus 12 is shown. The vehicle longitudinal motion control apparatus 12 includes at least one sensor 14, 16 and a controller 18 for automatically controlling the longitudinal motion of the vehicle 10 based upon a preceding vehicle 20, another object, vehicle data, load of the vehicle 10, map data, geographical data, and/or weather data. Upon approaching a preceding vehicle 20 traveling at a slower speed, the controller 18 will implement an eco-coasting maneuver that gradually reduces speed of the vehicle 10, thus avoiding abrupt brake usage and improving driver comfort and significantly improving energy efficiency and/or other KPI. The eco-coasting maneuver can reduce energy consumption by more than 50 percent compared to a braking maneuver of a conventional cruise control system.

As used herein, an eco-coasting maneuver may refer to an energy saving maneuver wherein the vehicle 10 coasts in a forward direction. The energy saving maneuver may be a coasting maneuver which involves a reduction of fuel or energy being supplied to the engine or a disengagement of power to one or more components of the drivetrain. During the energy saving maneuver, the vehicle 10 may reduce, maintain, or increase its speed. For example, if the vehicle 10 is traveling uphill or on a relatively flat roadway, the vehicle 10 may decrease its speed while coasting. Additionally, for example, if the vehicle 10 is traveling downhill, the vehicle 10 may increase its speed while coasting.

The vehicle 10 may include on-board sensors, off-board sensors, or other devices in communication with the controller 18 for sensing or otherwise identifying vehicle payload, vehicle longitudinal motion, vehicle GPS location data, tire pressure, fuel supply to the engine or energy supply to the motor, engine, motor, and/or driveshaft torque, other vehicle data or characteristics, forecasted or projected traffic motion, roadway or map data, geographical data, and/or weather data. The vehicle 10 may include a distance sensor 14 and/or a vehicle-to-vehicle (V2Va) communication device 16 for communicating with the V2V devices 22 of other vehicles 20. The distance sensor 14 may be a direct or indirect radar sensor, LIDAR sensor, other electromagnetic wavelength measurement, and/or optical sensor. The at least one sensor 14, 16 is in communication with the controller 18. The vehicle 10 may only include one sensor or two or more sensors. Vehicle longitudinal motion characteristics may, for non-limiting example, include vehicle longitudinal displacement, vehicle longitudinal velocity, vehicle longitudinal acceleration, and/or vehicle longitudinal jerk. Jerk, in the present sense, is defined as the first time derivative of acceleration, the second time derivative of velocity, and the third time derivative of position.

The controller 18 can also be in communication with one or more remote databases 24 via a network 26. The database (s) 24 may include map data, geographical data, traffic data, and/or weather data. The controller 18 can also be in communication with a user interface. The driver may input a coast command in the user interface to initiate the coasting procedure.

The controller 18 includes one or more modules. For example, the controller 18 can include an Adaptive Cruise Control (ACC) module 28 with an ACC algorithm, and a Predictive Cruise Control (PCC) module 30 with a PCC module, and an eco-coasting control module 32 with an eco-coasting algorithm. The modules 28, 30, 32 may or may not be integrated with one another. For example, the ACC module 28 may include the eco-coasting algorithm therein.

The ACC module 28 detects the preceding vehicle 20. The ACC algorithm commands an ACC target acceleration or deceleration, for example a 1 $m/s^2$ deceleration, and accordingly a braking maneuver is conducted. The ACC target acceleration or deceleration is calculated to maintain a safe and reasonable desired time gap, for example a three second time gap.

The PCC module 30 determines future roadway parameters, such as whether there is an uphill or downhill stretch of roadway ahead. The PCC algorithm commands a PCC target acceleration or deceleration, which may differ from the ACC target acceleration or deceleration.

The eco-coasting control module 32 detects and calculates a headway distance between the vehicle 10 and the preceding vehicle 20. Therein, the eco-coasting algorithm calculates the desired headway distance, coasting acceleration or deceleration, and/or coasting time of a preceding vehicle 20, object, or a roadway event, such as a downhill run, a turn, a stop, etc. For example, if the preceding vehicle 20 is determined to be decelerating, the eco-coasting algorithm will calculate a headway distance from the preceding vehicle 20 in order to perform an energy saving maneuver, such as a coasting maneuver. The eco-coasting control module 32 may allow the vehicle 10 to coast until a preset distance and/or travel time from the preceding vehicle 20 is achieved. Therein, the controller 18 will seamlessly switch between modules 28, 30, 32 to control vehicle longitudinal motion.

The headway distance may be continually calculated by the eco-coasting module 32. The headway distance $h_{eco}$, or in other words the coasting headway threshold, may be calculated with the following algorithm:

$$h_{eco}(v_0, v_f, v_1, a, c) = V^{-1}(v_f) + s_f(v_0, v_f, a, c) - v_1 t_f(v_0, v_f, a, c)$$

wherein $V^{-1}$ is the inverse of a range policy function from the ACC algorithm which sets a desired distance or range from a preceding vehicle 20, $v_0$ is the initial velocity of the vehicle 10 at a first time, $v_1$ is the velocity of the vehicle 10 at a second time, $v_f$ is the sensed or calculated velocity of the preceding vehicle 20, $s_f$ is the location of the rear of the preceding vehicle 20, $t_f$ is the coasting time calculated by the eco-coasting module as a function of acceleration, vehicle characteristics, drag, headwind, and geography, a is a function of the weight of the vehicle 10 and is expressed by $$a = \frac{mg}{m_{eff}}(\sin\phi + \cos\phi),$$

and c is a function of an air drag of the first vehicle and is expressed by $$c = \frac{k_0}{m_{eff}}.$$

The elevation of the roadway $\phi$ may be sensed and/or determined to be an average of the elevation ahead of the vehicle 10.

Accordingly, the coasting velocity $\dot{v}$ of the vehicle 10, may be simplified to the following equation when the elevation is constant:

$$\dot{v} = -a - cv^2$$

Figure 3:
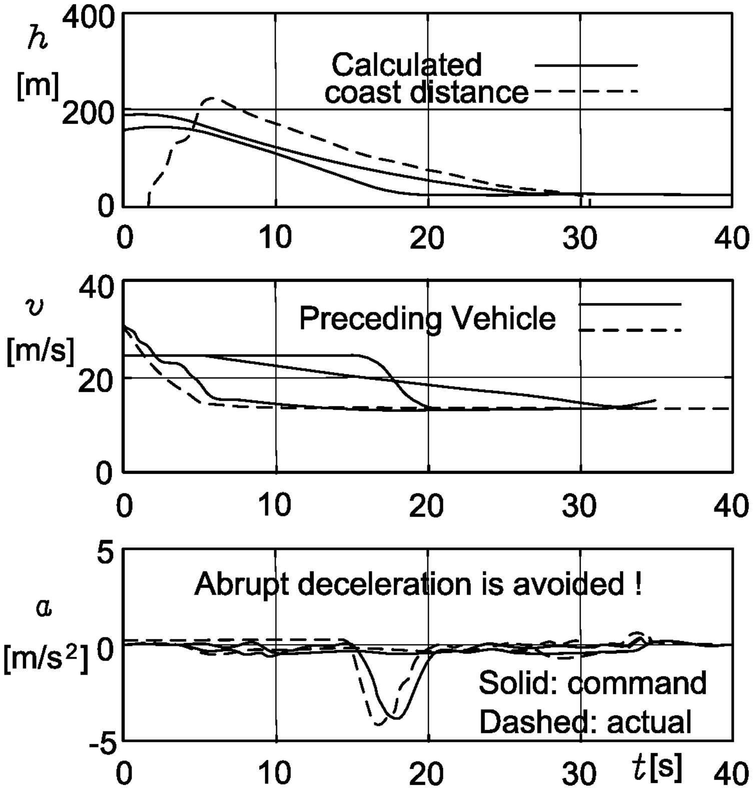
FIG. 3 is a graph illustrating the distance, velocity, and acceleration of the vehicle as the apparatus economically adjusts the longitudinal motion of the vehicle in an energy saving maneuver, as described herein.

Turning now to FIG. 3, a graph illustrating an eco-coasting maneuver of the vehicle longitudinal motion control apparatus 12 is shown. The graph illustrates the difference between a traditional braking maneuver and the eco-coasting maneuver as related to distance, velocity, and acceleration. With reference to the distance or headway h, the calculated headway distance is shown in dashed lines, the upper line, which starts slightly under 200 meters, represents the eco-approach design of the vehicle longitudinal motion control apparatus 12, and the lower line represents a traditional braking approach. As can be seen, under the eco-approach, the vehicle 10 approaches the preceding vehicle 20 more gradually. With reference to the velocity, the dual solid-and-dashed line represents the preceding vehicle 20, the line gradually sloping downward represents the eco-approach, and the line with the abrupt decrease in velocity, around 18 seconds, represents the traditional braking approach. With reference to the acceleration, the upper line with a small, yet prolonged, decrease in acceleration represents the eco-approach and the line with the sharp parabolic drop in acceleration represents the traditional braking approach. Thereby, under the eco-approach, the vehicle longitudinal motion control apparatus 12 calculates the headway distance needed, initiates the coasting of the vehicle 10, and accordingly allows the vehicle 10 to gradually approach the preceding vehicle 20 until the desired headway, e.g., time gap and/or distance, to the preceding vehicle 20 is achieved. Avoiding the abrupt braking procedure, and thereby the subsequent acceleration, of the traditional approach significantly reduces the energy usage.

Figure 4:
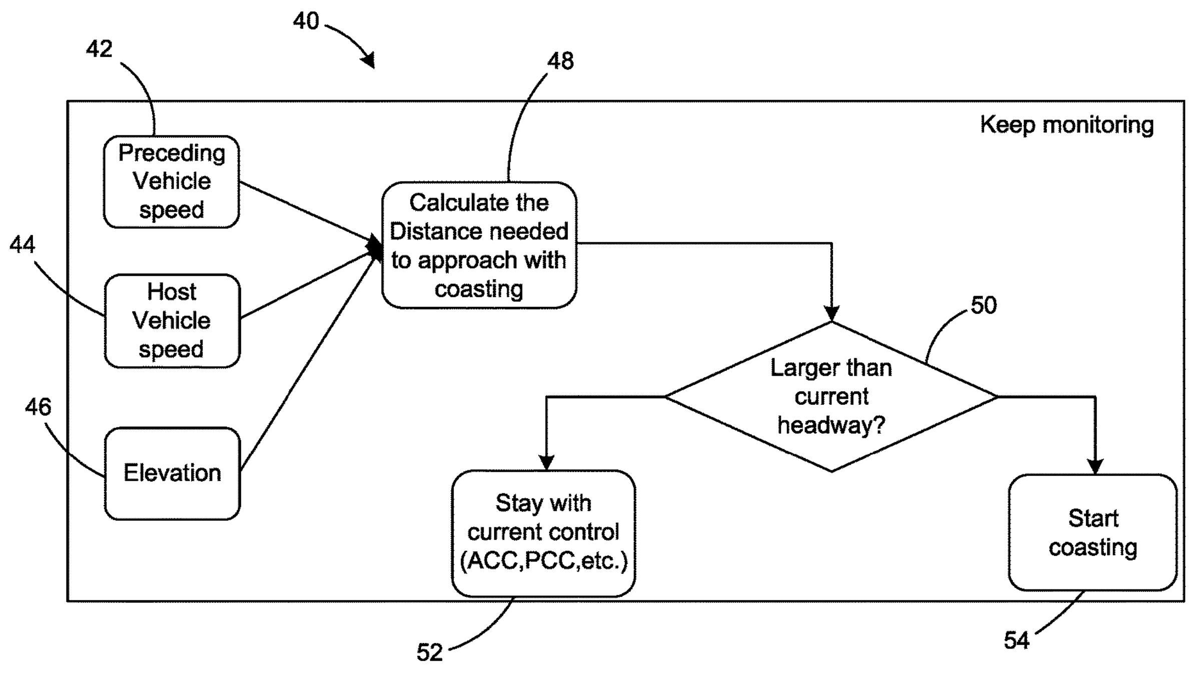
FIG. 4 is a flowchart of an embodiment of a method for economically decelerating a vehicle using the apparatus of the present disclosure, as described herein.

Turning now to FIG. 4, a flowchart 40 of a method of controlling the longitudinal motion of the vehicle 10 using the vehicle longitudinal motion control apparatus 12 is shown. The controller 18 determines the speed of the preceding vehicle 18, at step 42. The controller 18 also determines the speed of the vehicle 10, at step 44. The controller 18 also determines the elevation or other geographical data of the roadway, at step 46. The controller 18 may additionally determine any other desired vehicle characteristics, headwind, map data, weather data, etc. The controller 18, using the eco-coasting control module 32, calculates the headway distance or headway needed to conduct an energy saving maneuver, such as a coasting maneuver, at step 48. The controller 18, via the eco-coasting control module 32, will query whether the calculated headway distance is larger than the current distance between the vehicles 10, 20, at step 50. If the calculated headway distance is less than the current distance between the vehicles 10, 20, the controller 18 will stay with the present control module, which may be the ACC module 28 or the PCC module 30, at step 52. If the calculated headway distance is larger than the current distance between the vehicles 10, 20, the controller 18 will begin an energy saving maneuver, such as a coasting maneuver, at step 54.

While illustrative arrangements, and control logic therefor, implementing the economic vehicle longitudinal motion control apparatus have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A vehicle longitudinal motion control apparatus for controlling a longitudinal motion of a first vehicle, comprising:

a first sensor configured to sense a longitudinal motion of a second vehicle which precedes the first vehicle;

a second sensor configured to detect real-time elevation changes of a roadway; and a controller having at least one control module in communication with the sensors, the at least one control module configured to:

determine a longitudinal motion characteristic of the first vehicle;

determine a longitudinal motion characteristic of the second vehicle;

determine a headway distance between the first vehicle and the second vehicle by way of the following function:

$$h_{eco}(v_0, v_f, v_1, a, c) = V^{-1}(v_f) + s_f(v_0, v_f, a, c) - v_1 t_f(v_0, v_f, a, c)$$

wherein $V^{-1}$ is an inverse of a range policy function, $v_0$ is an initial velocity of the first vehicle at a first time, $v_1$, is a subsequent velocity of the first vehicle at a second time, $v_f$ is the velocity of the second vehicle, $s_f$ is a location of the second vehicle, $t_f$ is a coasting time, a is a function of a weight of the first vehicle, and c is a function of an air drag of the first vehicle; and wherein the function is based upon the longitudinal motion characteristic of the first vehicle, the longitudinal motion characteristic of the second vehicle, and at least one vehicle characteristic of the first vehicle; and the detected elevation changes;

apply an energy saving maneuver to the first vehicle based upon the determined headway distance to reduce a distance being greater than a current distance between the first vehicle and the second vehicle and increase energy efficiency of the first vehicle.

2. The vehicle longitudinal motion control apparatus of claim 1, wherein:

the longitudinal motion characteristic of the first vehicle is at least one of longitudinal displacement, longitudinal velocity, longitudinal acceleration, and longitudinal jerk; and the longitudinal motion characteristic of the second vehicle is at least one of longitudinal displacement, longitudinal velocity, longitudinal acceleration, and longitudinal jerk.

3. The vehicle longitudinal motion control apparatus of claim 2, wherein:

the energy saving maneuver further comprises a coasting maneuver; further wherein the coasting maneuver involves one of a reduction of fuel or energy being supplied to the engine or a disengagement of power to one or more components of the vehicle.

4. The vehicle longitudinal motion control apparatus of claim 3, wherein:

the at least one control module includes an eco-coasting control module having an eco-coasting algorithm for determining the headway distance.

5. The vehicle longitudinal motion control apparatus of claim 4, wherein:

the at least one control module further includes at least one of an Adaptive Cruise Control (ACC) module and a Predictive Cruise Control (PCC) module, and further if the headway distance is less than the current distance between the first vehicle and the second vehicle, the controller is configured to apply one of the ACC module and the PCC module.

6. A vehicle having a longitudinal motion control apparatus for controlling a longitudinal motion of the vehicle, comprising:

at least a first sensor configured to sense a longitudinal motion of a preceding vehicle;

at least a second sensor configured to detect real-time elevation changes of a roadway; and a controller having at least one control module in communication with the first and second sensors, the at least one control module configured to:

determine a longitudinal motion characteristic of the vehicle;

determine a longitudinal motion characteristic of the preceding vehicle;

determine a headway distance between the vehicle and the preceding vehicle by way of the following function:

$$h_{eco}(v_0, v_f, v_1, a, c) = V^{-1}(v_f) + s_f(v_0, v_f, a, c) - v_1 t_f(v_0, v_f, a, c)$$

wherein $V^{-1}$ is an inverse of a range policy function, $v_0$ is an initial velocity of the vehicle at a first time, $v_1$ is a subsequent velocity of the vehicle at a second time, $v_f$ is the velocity of the preceding vehicle, $s_f$ is a location of the preceding vehicle, $t_f$ is a coasting time, a is a function of a weight of the vehicle, and c is a function of an air drag of the vehicle; and wherein the function is based upon the longitudinal motion characteristic of the vehicle, the longitudinal motion characteristic of the preceding vehicle, at least one vehicle characteristic of the vehicle, and the detected elevation changes; and apply an energy saving maneuver to the vehicle based upon the determined headway distance being greater than a current distance between the vehicle and preceding vehicle to increase energy efficiency of the vehicle and reduce the distance between the vehicle and the preceding vehicle.

7. The vehicle of claim 6, wherein:

the longitudinal motion characteristic of the first vehicle is at least one of longitudinal displacement, longitudinal velocity, longitudinal acceleration, and longitudinal jerk; and the longitudinal motion characteristic of the preceding vehicle is at least one of longitudinal displacement, longitudinal velocity, longitudinal acceleration, and longitudinal jerk.

8. The vehicle of claim 7, wherein at least one of:

the energy saving maneuver further comprises a coasting maneuver; wherein the coasting maneuver involves one of a reduction of fuel or energy being supplied to the engine or a disengagement of power to one or more components of the vehicle.

9. The vehicle of claim 8, wherein:

the at least one control module includes an eco-coasting control module having an eco-coasting algorithm for determining the headway distance.

10. The vehicle of claim 9, wherein:

the at least one control module further includes at least one of an Adaptive Cruise Control (ACC) module and a Predictive Cruise Control (PCC) module, and further if the headway distance is less than the current distance, the controller is configured to apply one of the ACC module and the PCC module.

11. A method of controlling a longitudinal motion of a first vehicle, comprising the steps of:

providing a vehicle longitudinal motion control apparatus having at least a first sensor configured to sense a longitudinal motion of a second vehicle which precedes the first vehicle; at least a second sensor configured to detect real-time elevation changes of a roadway; and a controller having at least one control module in communication with the first and second sensors;

configuring the at least one control module to determine a longitudinal motion characteristic of the first vehicle;

configuring the at least one control module to determine a longitudinal motion characteristic of the second vehicle;

configuring the at least one control module to determine a headway distance between the first vehicle and the second vehicle by way of the following function:

$$h_{eco}(v_0, v_f, v_1, a, c) = V^{-1}(v_f) + s_f(v_0, v_f, a, c) - v_1 t_f(v_0, v_f, a, c)$$

wherein $V^{-1}$ is an inverse of a range policy function, $v_0$ is an initial velocity of the first vehicle at a first time, $v_1$ is a subsequent velocity of the first vehicle at a second time, $v_f$ is the velocity of the second vehicle, $s_f$ is a location of the second vehicle, $t_f$ is a coasting time, a is a function of a weight of the first vehicle, and c is a function of an air drag of the first vehicle; and wherein the function is based upon the longitudinal motion characteristic of the first vehicle, the longitudinal motion characteristic of the second vehicle, at least one vehicle characteristic of the first vehicle and the detected elevation changes; and configuring the at least one control module to apply an energy saving maneuver to the first vehicle based upon the determined headway distance being greater than a current distance between the first vehicle and the second vehicle to reduce a distance between the first vehicle and the second vehicle and increase energy efficiency of the first vehicle.

12. The method of claim 11, wherein:

the longitudinal motion characteristic of the first vehicle is at least one of longitudinal displacement, longitudinal velocity, longitudinal acceleration, and longitudinal jerk; and the longitudinal motion characteristic of the second vehicle is at least one of longitudinal displacement, longitudinal velocity, longitudinal acceleration, and longitudinal jerk.

13. The method of claim 12, wherein:

the energy saving maneuver further comprises a coasting maneuver; wherein the coating maneuver involves one of a reduction of fuel or energy being supplied to the engine or a disengagement of power to one or more components of the vehicle.

14. The method of claim 13, wherein:

the at least one control module further includes at least one of an Adaptive Cruise Control (ACC) module and a Predictive Cruise Control (PCC) module, and further if the headway distance is less than the current distance between the first vehicle and the second vehicle, the controller is configured to apply one of the ACC module and the PCC module.

* * * * *